May 6, 1958   J. M. CONSTABLE ET AL   2,833,932
PORTABLE HIGH-SENSITIVITY RADIATION MEASURING CIRCUIT
Filed Jan. 25, 1956
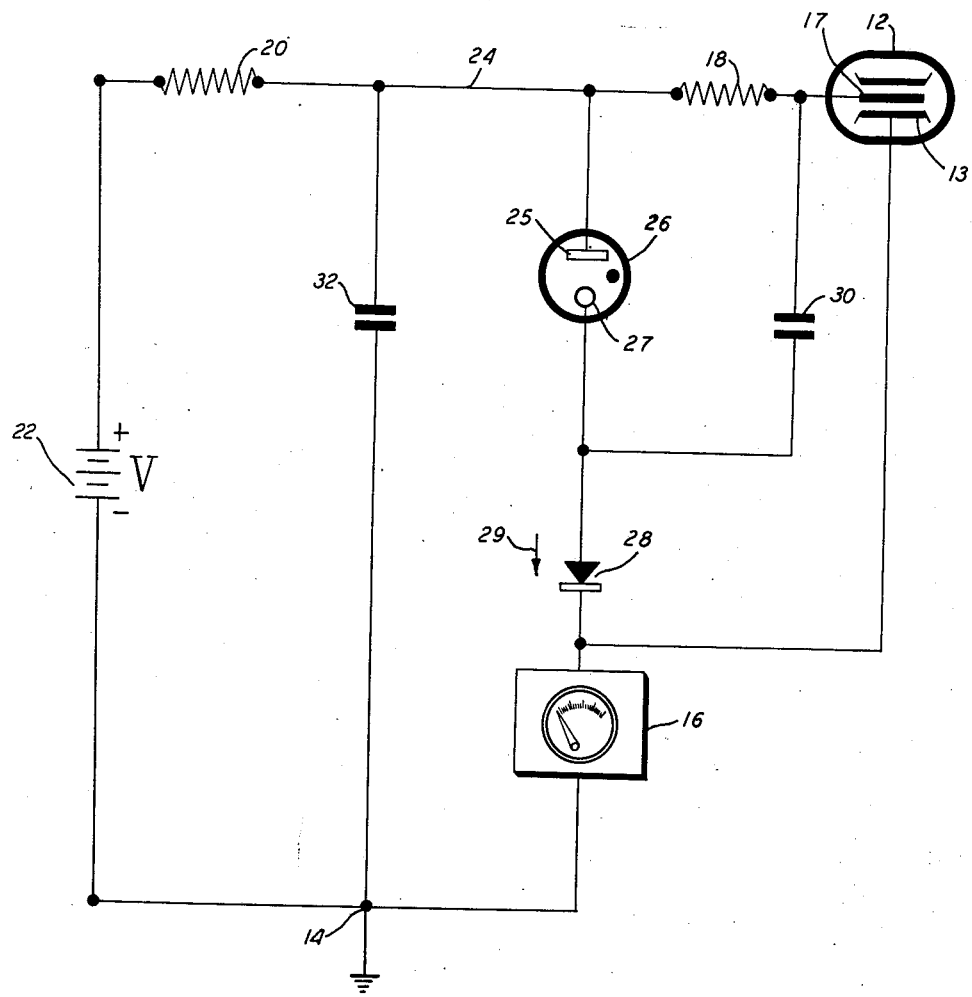
INVENTORS
JAMES M. CONSTABLE
GERARD J. ACHTELLIK
BY
*Curtis, Morris & Safford*
ATTORNEYS

2,833,932
PORTABLE HIGH-SENSITIVITY RADIATION MEASURING CIRCUIT

James M. Constable, White Plains, N. Y., and Gerard J. Achtellik, North Greenwich, Conn., assignors to Electronic Products Company, Mount Vernon, N. Y.

Application January 25, 1956, Serial No. 561,331

10 Claims. (Cl. 250—83.6)

This invention relates to an electric apparatus using a Geiger-Mueller tube to measure penetrating radiation.

An object of this invention is to provide such an apparatus which is portable and which can measure accurately very low intensity radiation.

A further object is to provide a very sensitive portable radiation meter which can operate on self-contained batteries for long periods of time.

Still another object is to provide an improved portable radiation meter which can be manufactured at relatively low cost and which is rugged and reliable.

These and other objects will in part be understood from and in part pointed out in the description given hereinafter.

The measurement of very weak intensity penetrating radiation is not difficult where high cost, large size and high power demand of the measuring instrument are relatively unimportant. Well equipped laboratories have long been supplied with such instruments, but these instruments are not in any sense portable.

On the other hand, where a radiation measuring instrument must be light and small enough to carry and yet able to operate continuously for many hours on self-contained batteries, the problems of obtaining the great efficiency of operation needed to measure low intensity radiation are acute. This is particularly true where a Geiger-Mueller (G–M) tube is used as the radiation detector.

In a G–M tube, photons of penetrating radiation striking the tube cause ionization and resulting breakdown of the gas in the tube thereby permitting pulses of current to pass through, the number of pulses per unit of time being proportional to radiation intensity. However, perhaps only one photon in a hundred will cause gas ionization and as a result the efficiency of a G–M tube is relatively low. In spite of this shortcoming, such tubes, because of their relatively low cost, reliability, and ease of use, are widely preferred to other types of radiation detectors, such as scintillation crystals.

The present invention provides a radiation measuring circuit incorporating a G–M tube which compensates for the low efficiency and other characteristics of the tube to such an extent that radiation intensity over the range from 0.1 to 500 milliroentgens per hour can easily and accurately be measured. In accordance with the invention, the output pulse from the G–M tube is connected to a cold gas-discharge diode in such fashion that the latter, for each current pulse from the G–M tube, breaks down and conducts momentarily giving a much larger current pulse than that from the G–M tube. Further, the circuit is advantageously arranged so that a single relatively low supply voltage suffices. The number of circuit components is few and these are small, relatively inexpensive and reliable so that the device is truly portable. The efficiency of the circuit of this invention is so great that it can operate continuously for several days on a single flashlight battery. The radiation measuring device according to the present invention thus possesses several important advantages over that disclosed in the inventor Constable's U. S. Patent No. 2,549,058.

A better understanding of the invention together with a fuller appreciation of its many advantages will best be gained from a study of the following description given in connection with the accompanying drawing which shows a circuit embodying features of the invention.

The circuit shown in the drawing includes a G–M tube 12 whose cathode 13 is direct-current connected to ground circuit 14 through an electric meter unit, generally indicated at 16, and whose anode 17 is energized, through the resistors 18 and 20 by a battery 22 whose positive terminal is connected to resistor 20 and whose negative terminal is connected to ground 14. Connected to the lead 24 joining resistors 18 and 20, is the plate 25 of a cold cathode gas-discharge diode 26. The cathode 27 of this diode is connected to ground 14 in series with a rectifier 28 and the meter 16. Rectifier 28 is poled for forward or positive current flow in the direction of the arrow 29 and it, together with meter 16, provides a direct current path to ground for any current which may flow through gas-discharge tube 26.

The breakdown voltage of this gas-discharge tube 26 is made slightly greater than voltage V, while the minimum operating voltage of G–M tube 12 is somewhat less than V. To cause gas-discharge tube 26 to conduct each time the G–M tube passes a pulse of current, each of these pulses is coupled in series with voltage V to tube 26 by the capacitor 30. Thus, for each current pulse a momentary voltage, negative with respect to ground, is developed across rectifier 28 and meter 16, rectifier 28 being poled for positive current flow of opposite polarity. The addition of each negative voltage pulse across rectifier 28 and meter 16 to supply voltage V causes gas-discharge tube 26 to break down and conduct from lead 24 to ground 14. The magnitude of this current per unit of time is proportional to the number of pulses per unit of time generated by G–M tube 12. Since this current is relatively much larger than that through the G–M tube, a relatively large deflection of meter 16 is obtained in this circuit for very low intensity radiation impinging on the G–M tube.

Each time gas-discharge tube 26 conducts, it discharges the capacitor 32 which is adapted to be charged to voltage V. Resistor 20 connected in series with this capacitor and the supply voltage interrupts the discharge of tube 26 when capacitor 32 discharges. The de-ionization time of gas-discharge tube 26 is short enough and the size of capacitor 32 small enough so that over the normal range of measurement of the circuit, tube 26 discharges with each pulse through G–M tube 12.

When the intensity of radiation incident on G–M tube 12 becomes high enough, the pulses generated by this tube become relatively smaller in amplitude and closely spaced in time. In such event these pulses from G–M tube 12 may be insufficient to break down gas-discharge tube 26 and thus the reading of meter 16 may be "blocked," i. e. reduced even to zero, even though G–M tube 12 is exposed to intense radiation. To prevent such blocking, the cathode 13 of G–M tube 12 is returned to ground circuit 14 through meter unit 16. When so connected the full amount of current through G–M tube 12 will pass through the meter. Thus, at high radiation levels where this G–M tube current is appreciable it will produce a meter reading even though gas-discharge tube 26 fails to conduct; and at low radiation levels the effect of current through G–M tube 12 on the reading of meter 16 is negligible.

Gas-discharge tube 26 is advantageously one with a very short de-ionization time. Such a tube is disclosed and claimed in the inventor Constable's co-pending application, Serial No. 544,206, filed November 1, 1955. The use of such a tube makes possible the measurement of relatively high intensity radiation since the time constant of resistor 20-capacitor 32 can be quite small, i. e. capacitor 32 can be charged relatively soon after tube 26 has discharged.

The operation of G–M tube 12 is virtually unaffected by the presence of gas-discharge tube 26 and rectifier 28 connected in shunt with it since the effective impedance of these latter elements is very high.

Meter 16 can be any one well known to the art or it can be that disclosed in the inventor Constable's co-pending application, Serial No. 519,544, filed July 1, 1955. In a model substantially identical to the circuit illustrated which has been built and tested, the following components and sizes were found satisfactory: G–M tube 12, type EPGLM29LI, manufactured by Electronic Products Company; resistor 18, 1.0 megohm; resistor 20, 100,000 ohms; gas-discharge tube 26, type EP92-A, manufactured by Electronic Products Company and disclosed in co-pending application Serial No. 544,206, filed November 1, 1955; rectifier 28, crystal diode type 1N217; capacitor 30, 33 micro-micro-farads; capacitor 32, 250 micro-micro-farads; and voltage V, 350 volts.

The above description is intended in illustration and not in limitation of the invention. Various minor changes and modifications in the circuit illustrated may occur to those skilled in the art and these may be made without departing from the spirit or scope of the invention as set forth.

We claim:

1. A radiation measuring circuit including a G–M tube, source means to supply a voltage high enough to energize said G–M tube, impedance means conductively connecting said source means and said G–M tube, a cold cathode gas discharge diode and a current rectifier connected in series with each other and conductively connected to said source means, the breakdown voltage of said gas discharge diode being greater than the output voltage of said source means, means to couple output pulses of voltage generated by said G–M tube across said current rectifier in such polarity that these pulses cause gas breakdown in said gas discharge diode, and meter means connected to indicate the average circuit current and hence the intensity of radiation impinging on said G–M tube.

2. The combination of elements as in claim 1 in further combination with a resistance-capacitance network coupled to said gas-discharge diode to interrupt current flow therein the de-ionization of said gas-discharge diode being very short and the time constant of said resistance-capacitance network being small, and in which said means to couple includes a capacitor connected between the said gas discharge diode and an electrode of said G–M tube.

3. The combination of elements as in claim 1 in which said meter means is connected in series with said G–M tube and said gas diode whereby blocking of said circuit at high levels of radiation is prevented.

4. A pulse circuit comprising voltage means, a cold cathode gas-discharge diode and a current rectifier connected in series with said gas diode and conductively connected to said voltage means, the breakdown voltage of said gas diode being greater than the output of said voltage means, and pulse means for applying a voltage across said current rectifier to cause said gas diode to break down and conduct.

5. The combination of elements as in claim 4 in further combination with means to stop the discharge of said gas-discharge diode a short time after the discharge is initiated.

6. The combination of elements as in claim 5 in which said pulse means includes a G–M tube one of whose electrodes is capacitively connected to said diode to produce thereacross a voltage pulse in series with said voltage means.

7. In a portable radiation measuring circuit adapted to measure radiation over a relatively wide range from very low intensities, source means to supply a voltage V, a cold cathode gas-discharge diode and a current rectifier connected in series, said gas-discharge diode having a breakdown voltage greater than voltage V, means to interrupt current flow in said diode once initiated and conductively connecting said diode and rectifier in series across said source means, a G–M tube conductively connected to said source means and adapted to be energized thereby, capacitive means for connecting output pulses from said G–M tube in series with said gas-discharge diode and said source means in such manner that said pulses cause breakdown of said gas-discharge diode, and meter means direct-current connected so that current from said G–M tube and from said gas-discharge tube passes through it whereby blocking of said circuit in high intensity radiation is prevented and said circuit can accurately measure radiation over a relatively wide range from a very low level.

8. In a portable radiation measuring circuit of the character described, source means to supply a voltage V, a G–M tube and first and second resistors connected in series and across said source means and adapted to be energized to conduction thereby when said G–M tube is exposed to radiation, a first capacitor connected across said source means in series with one of said resistors, a cold cathode gas-discharge diode and a crystal rectifier connected in series and across said first capacitor, the breakdown voltage of said gas diode being greater than voltage V, a second capacitor connected to said second resistor and said rectifier and adapted to apply voltage pulses generated by said G–M tube in series with said source means and said gas diode to cause it to break down and conduit, and meter means connected to indicate current flow in said circuit.

9. A high efficiency, high sensitivity, low cost portable radiation measuring circuit comprising, a radiation sensitive device adapted to emit low current high impedance electric pulses when exposed to penetrating radiation, the number of pulses emitted per unit of time being related to the intensity of the radiation, voltage supply means for supplying a voltage sufficient to energize said device, a cold cathode two electrode gas discharge tube connected to said supply means and having a breakdown voltage less than said supply voltage, a current conducting element connected in series with said gas discharge tube and said supply means, said element having a relatively low direct current resistance in one direction and having a relatively high impedance in the opposite direction to pulses emitted from said radiation sensitive device, pulses from said device being coupled across said element in series adding relation with said supply voltage whereby when a pulse appears across said element said gas discharge tube will break down and conduct, and indicating means connected in said circuit for indicating the occurrence of currents through said gas discharge tube.

10. The combination of elements as in claim 9 wherein said supply means has relatively low resistance, wherein said radiation sensitive device is a G–M tube, wherein said current conducting element is a crystal rectifier, wherein said indicating means is a microammeter connected in series with said gas discharge tube and said crystal rectifier, and in further combination with a resistor and a capacitor connected in series across said supply means, said capacitor being connected in parallel with said gas discharge tube, crystal rectifier and microammeter, said resistor being connected in series with said supply means, said gas discharge tube, said crystal rectifier and said microammeter, said resistor, capacitor and gas discharge tube being adapted to discharge and charge as a one-shot relaxation oscillator each time said gas discharge tube breaks down.

References Cited in the file of this patent

UNITED STATES PATENTS 2,582,367  Williams et al. _____ Jan. 15, 1952